United States Patent Office 3,619,996
Patented Nov. 16, 1971

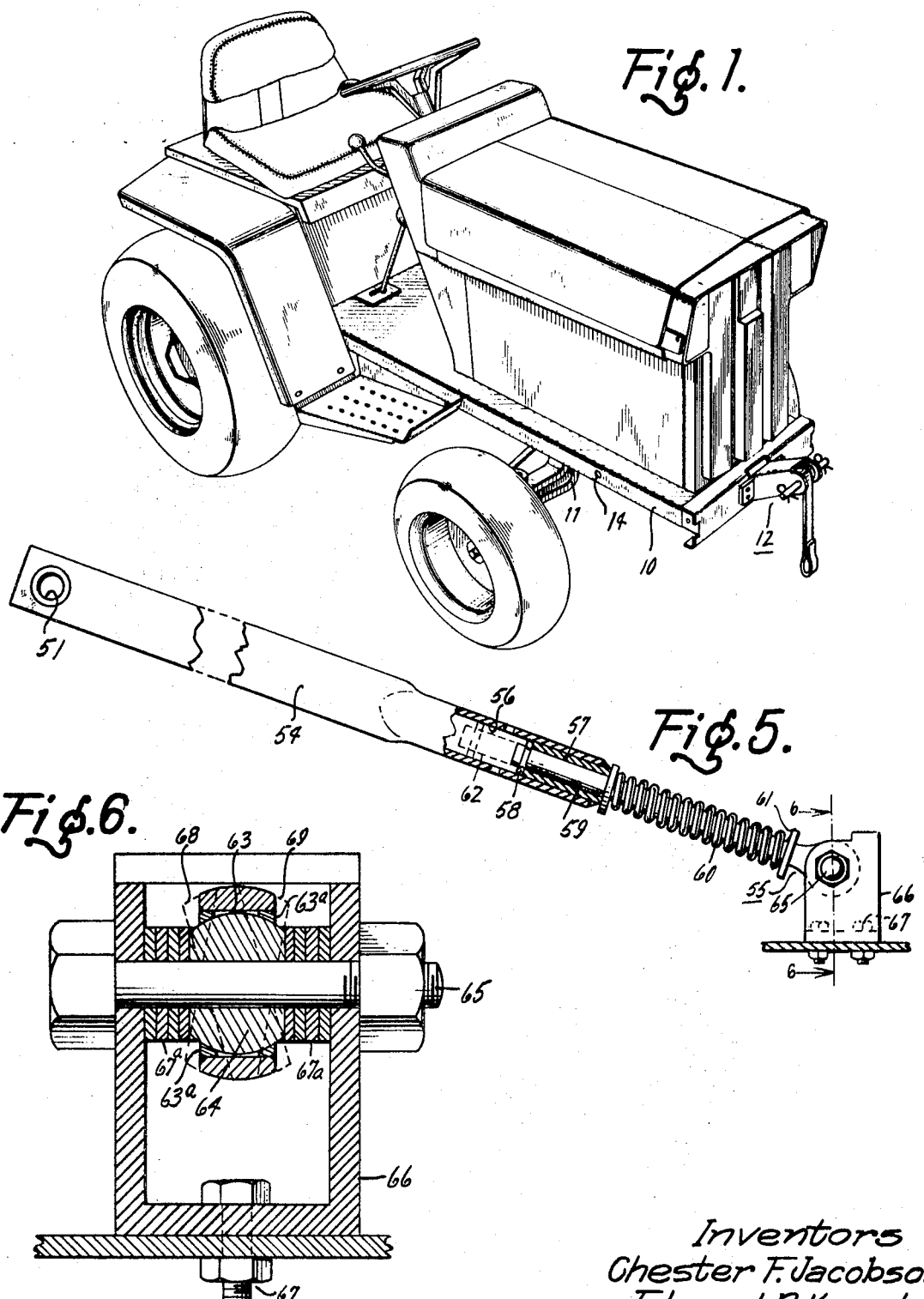

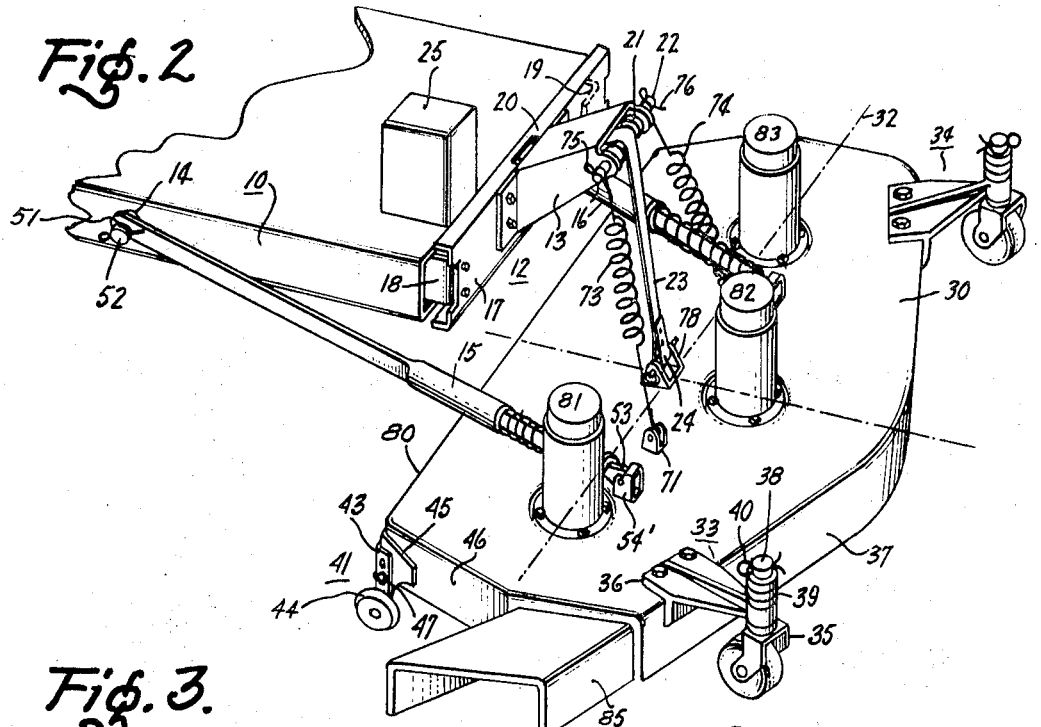
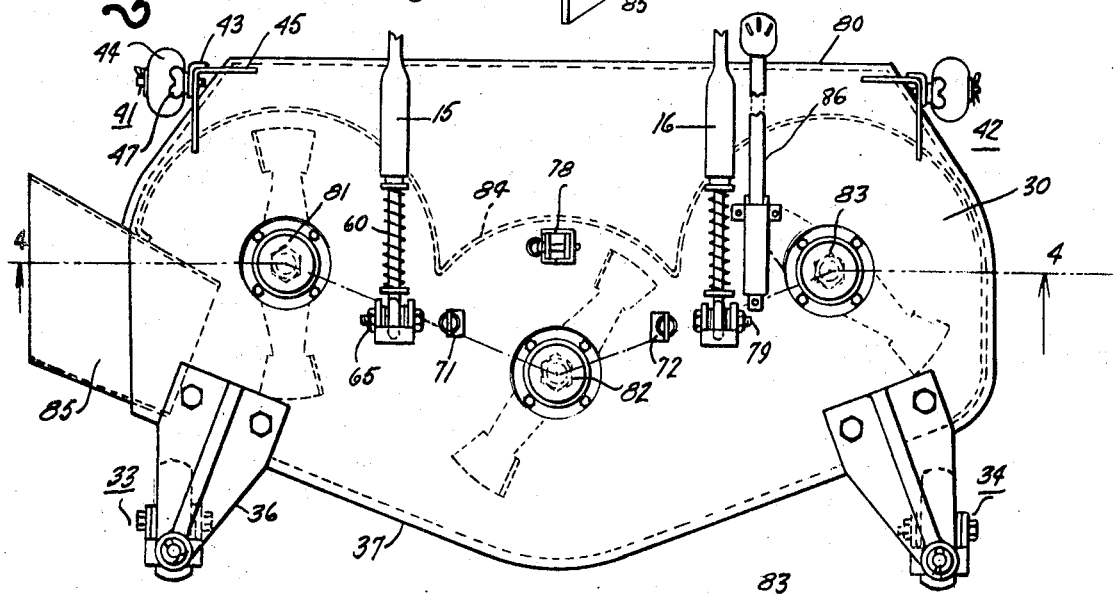
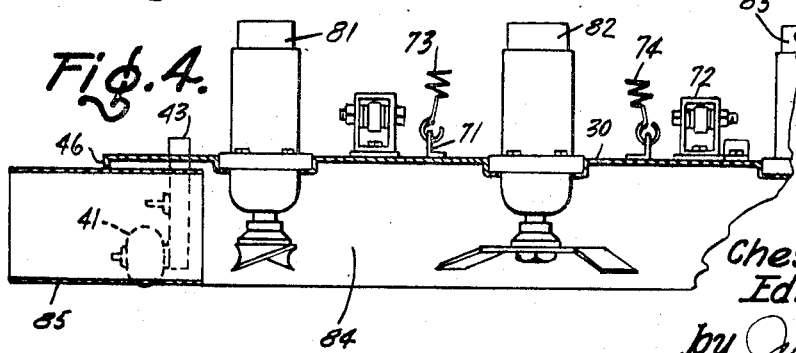
Inventors
Chester F. Jacobson
Edward P. Kexel
by Julius J. Zaskalicky
Their Attorney

3,619,996
MOWER APPARATUS
Chester F. Jacobson, Scotia, and Edward P. Kexel, Altamont, N.Y., assignors to General Electric Company
Filed Feb. 12, 1970, Ser. No. 10,865
Int. Cl. A01d 35/26
U.S. Cl. 56—13.6
8 Claims

ABSTRACT OF THE DISCLOSURE

A pair of spring loaded pusher rods connect the deck or housing of the mower to the chassis of the tractor. One end of each of the rods is pivotally connected to a respective side of the chassis and the other end of each of the rods is secured to the deck by a respective ball joint assembly. Springs also connect the deck to the front end of the chassis to facilitate operation of the mower in association with a tractor. A capability is also provided for enabling the mower to be lifted off the supporting surface without exposing the blades of the mower.

---

The present invention relates in general to mowers for use with tractors and in particular to rotary mowers suitable for attachment to and operation from the front or rear end of a tractor.

Rotary mowers as attachments to propelling vehicles are commonly used for cutting grass. In such application, the mower is usually mounted between a front and rear wheel assembly of the tractor. Such mowers are hard to assemble, difficult to service, and are limited in their ground following capability. The present invention is directed to the provision of a rotary mower assembly which avoids such disadvantages of the prior art.

Accordingly, an object of the present invention is to provide improvements in rotary motors.

Another object of the present invention is to provide improved means for attaching mowers to a propelling vehicle to provide improved performance in the mower and in the combination of the mower and the propelling vehicle.

Another object of the present invention is to provide attaching means which enables easy attachment to and detachment from a propelling vehicle.

A further object of the present invention is to provide a mower which is easy to service while attached to the tractor.

In carrying out the present invention in one illustrative embodiment thereof, there is provided a deck or housing member substantially planar in form for supporting the rotary blade elements of the mower. The housing member has a central longitudinal axis and a central transverse axis orthogonal thereto. Roller means are provided in each of the four quadrants defined by the intersection of the aforementioned axes for maintaining the housing in a fixed and desired spaced relationship to the surface supporting the roller means which permits movement along the supporting surface. A pair of rod members are provided, each of the rod members is adapted at one end to be pivotally attached to a respective side of the chassis member of a propelling vehicle and pivotal about a horizontal axis. Each of the other ends of the rod members are attached to a respective point on the housing by means of a universal or ball joint. Each of the rod members is provided with resilient means located between the ends thereof to permit movement of the ends along the longitudinal axis of the respective rod member.

The features of our invention which we desire to protect herein are pointed out with particularity in the appended claims. The invention itself, however, both as to its organization and method of operation together with further objects and advantages thereof may best be understood by reference to the following description taken in connection with the accompanying drawings wherein:

FIG. 1 is a perspective view of a tractor including a lift assembly to which the mower apparatus of the present invention is adapted to be attached.

FIG. 2 is an enlarged perspective view of the forward part of the chassis member of the vehicle of FIG. 1 showing a portion of the lift assembly and in particular showing the manner of attachment of the mower apparatus to the chassis member.

FIG. 3 is a plan view of the housing or deck member of the mower apparatus of FIG. 3.

FIG. 4 is a sectional view of the apparatus of FIG. 3 taken along section line 4—4 thereof.

FIG. 5 is an enlarged sectional view of a portion of a spring loaded rod member of the apparatus of FIG. 4.

FIG. 6 is an enlarged sectional view of the ball joint assembly of the member of FIG. 5 taken along section line 6—6 of FIG. 5.

Referring now to FIG. 1, there is shown an electrically driven tractor including a chassis member 10 on the underside of which the undercarriage elements such as front wheel assembly 11, steering assembly and rear wheel assembly are secured. Connected to the front end of the chassis of the tractor is shown a lift assembly 12. Also shown is a cylindrical hole 14 in a side of the chassis member 10 for attachment of portions of the mower apparatus to be described below.

Reference is now made to FIG. 2 which shows the front end of the chassis member 10 to which the boom member 13 of the composite lift assembly 12 is secured. A pair of cylindrical holes 14, only one of which is shown, is located in the side portions of the chassis member 10 for attachment of rod members 15 and 16. The holes 14 are located adjacent the support on chassis member 10 for the front wheel assembly. The lift assembly 12 includes a boom member 13 of generally U-shaped cross section and a base member 17 extending from one side to the other of the chassis member and a pair of prong elements 18 and 19 of generally elongated configuration. One end of the boom member 13 is secured to a central portion 20 of the base member by screws or other suitable means. The other end of the boom is provided with a cylindrical roller 21 supported on a shaft 22 extending from one side to the other side of the boom member. One prong element 18 is secured into one end of the base member 17 and the other prong element 19 is secured to the other end of the base member 17. The prong elements 18 and 19 are secured to the portions of the chassis member by welding or by other fastening means. A tape member 23 is provided extending over the roller member 22 and has at one end a fastening element 24 which may be simply the end of the tape formed into a loop, and at the other end connected to a winch assembly 25 for winding and unwinding the tape to raise or lower the mower assembly. The winch assembly is described in detail in the aforementioned patent application.

The mower apparatus includes a substantially planar housing member 30 or deck. The housing member has a longitudinal axis 31 centrally located thereon and a transverse axis 32 perpendicular or orthogonal to the longitudinal axis and also centrally located. In each of the four quadrants formed by the intersection of the two axes, roller means are provided for maintaining the housing in a fixed spaced relationship to the surface to be mowed.

Roller wheel assemblies 33 and 34 in the forwardly located two quadrants each include a caster 35 and a swivel frame 36 therefor. At one end the swivel frame 36 is mounted to the housing 30 and the front skirt 37 of the mower and has a vertically extending cylindrical hole at the other end thereof. The upward extending shaft 38 of the caster is fitted into the cylindrical hole and is free to rotate therein. A plurality of washers 39 are provided about the shaft above and below the swivel frame and are secured in place by a cotter pin 40 in a hole at the upper end of the shaft 38. By proportioning the number of washers above and below the swivel frame the height of the housing or deck with respect to the ground or supporting surface may be adjusted. The front roller wheel assemblies provide ground sensing and prevent scalping of the grass being mowed. Roller wheel assemblies 41 and 42 in the rear two quadrants each include a vertical frame member 43 at the lower end of which is located a wheel 44 free to rotate about an axle attached thereto. The frame member 43 has a plurality of vertically spaced holes therein and is adapted to bear against a mating bracket 45 secured to the side skirt 46 of the mower to provide a snug fit therewith. The bracket 45 is provided with a hole which is registerable with each of the holes in the frame member 43. A bolt 47 with a wing nut is provided through the hole in the bracket and through a hole in the frame to adjustably secure the frame thereto. Accordingly, the spacing of the housing with respect to the ground may be adjusted by selection of the appropriate hole in the frame member 43 to register with the hole in the bracket 45. The rear roller wheel assemblies maintain stability of the blades of the mower and also eliminate scalping.

As mentioned a pair of rod members 15 and 16 are provided for securing the housing or deck 30 of the mower to the side of the chassis member 10. Each rod member has a cylindrical opening 51 at one end for receiving a clevis pin 52 for rotatably securing the rod member to the side portion of the chassis member through the hole 14 to permit axial rotation of the rod member about a horizontal axis. Each of the other ends of the rod members 15 and 16 includes a ball joint member 53 which is supported in a socket assembly 54' to form a ball joint and permit the housing member 30 free movement to a limited extent about anyone of three mutually perpendicular axes.

Reference is now made to FIG. 5 which shows the details of the rod member 15 and to FIG. 6 which shows the ball and socket assembly referred to above. Rod member 16 is identical to rod member 15. The rod member 15 has two sections 54 and 55 which are aligned along the longitudinal axis thereof. The remote end of section 54 includes the cylindrical opening 51 referred to above. The end of the section 54 located intermediate the ends of the rod member being a cylindrical in cross section defines a bore 56 therein and the end thereof has a plug or collar 57 secured therein. Collar 57 defines a cylindrical bore 59 therein for slidably receiving the end portion of the other section 55. A pin 58 is provided on the end of the section 55 which is disposed within and is adapted to freely move in the cylindrical bore 56 and abut against the inwardly located shoulder of the collar 57 in the position shown in solid lines. A spring member 60 is provided between the collar 57 on the intermediate portion of section 54 and a corresponding shoulder 61 on the other section 55 of the rod member. The spring member 60 functions to bias outward the ends of the rod member 15. When a compressive force is applied between the ends of the rod member, the rod is reduced in overall length as suggested by the dotted portion 62 of the intermediate end of section 55. The remote end of section 55 has a cylindrical opening 63 into which end sections 63a have been welded to provide a spherical surface to the opening. A ball 64 having a pair of diametrically opposed planar surfaces is provided. The spherical surface of the ball engages the spherical surface of the opening of the remote end of section 55. The ball 64 is secured to a bolt 65 with the longitudinal axis of the bolt perpendicular to the planar surfaces of the wall as shown particularly in FIG. 6. The bolt 65 is secured to the legs of the U-shaped member 66 through openings therein. A plurality of washers 67a is provided between each leg and the planar surfaces of the ball. The base of the U-shaped member 66 is secured to the housing member 30 by a set of bolt assemblies 67. Accordingly, the remote end of the section 55 of the rod member is free to rotate to a limited extent about any one of three mutually perpendicular axes with respect to the ball secured to the bolt member. The extent of such motion about an axis perpendicular to the plane of FIG. 6 through the center of the ball is indicated by dotted sections 68 and 69 of the rod section 55. The combination of the ball joint action of the ball and socket assembly and the spring loaded rod members 15 and 16 enables the mower housing to follow the surface of the ground on which the mower travels independent of the motion of the propelling vehicle. The ball joint permits the mower housing to roll about a longitudinal axis and to pitch about a transverse axis as well as to yaw by virtue of the spring loaded rod members. The spring loaded rod members also will absorb the impacts of obstacles which the mower may strike.

The mower housing member 30 is also provided with a pair of fasteners 71 and 72 substantially equally spaced from the longitudinal axis 31 and generally located adjacent the transverse axis 32 for supporting the ends of a pair of respective springs 73 and 74. Each of the fasteners are in the form of a U-shaped member with the base thereof secured to the housing and having a pin secured between the legs of the U and engaging a hook on the spring. The other ends of the springs 73 and 74 hook on extensions on the shaft 22 of the lift assembly and retained thereon by respective pins 75 and 76 secured to the ends of the shaft 22. The springs 73 and 74 have a sufficiently stiff spring constant to relieve part of the loading of the mower on the wheels of the mower assembly and also to shift a portion of the weight thereof to the chassis thereby providing not only improved ground following action of the mower but also improved operation of the mower in combination with the tractor.

The fastener 24 of the tape member 23 of the lift assembly is secured to a fastener 78 located on the central longitudinal axis of the housing and located between the line joining the bolts 65 and 79 of the ball joint assemblies and the rear end 80 of the housing assembly. When the lift assembly 12 is operated, the housing 30 is raised substantially horizontally with the front end of the housing oriented downward or horizontally. It is desirable for safety reasons to maintain the blades of an operating mower unexposed when the mower is lifted off the ground. The location of the lift fastener 78 on the housing assembly at the place indicated enables lifting action to be achieved without tilting the mower and exposing the blades. The mower may also be tilted about the ball joint assemblies attached to rods 15 and 16 to expose the underside of the mower for servicing. Such tilting is done by lifting the front end of the mower. A handle may be provided on the front end of the mower for that purpose. Of course, the tape member 23 is disconnected from the mower before the front end of the mower is lifted. Preferably, the housing assembly 30 is located close to the front end of the tractor to facilitate the steering action yet retaining the ground following action. The location of the support points on the chassis member 10 for the ends of the rod members 15 and 16 near where the front wheel assembly is supported assures good operating action.

FIG. 3 shows a plan view of the housing member of FIG. 2 showing three electric motors 81, 82 and 83 supported therein with their rotational axes extending perpendicular to the housing member, that is vertically downward. A power cord 86 is provided plugable into a socket on the tractor for supplying power to the electric motors.

FIG. 4 shows the electric motors 81, 82 and 83 each witht a blade attached thereto and the side skirt 46 and guiding duct 84 of the mower for channeling mowed grass outward through the discharge duct 85 secured to the side skirt 46.

While the invention has been described in a specific embodiment, it will be appreciated that many modifications may be made by those skilled in the art and we intend by the appended claims to cover all such modifications and changes as fall within the true spirit and scope of the invention.

What we claim as new and desire to secure by Letters Patent of the United States is:

1. Mower apparatus for use with a tractor comprising
   a substantially planar housing member for supporting the rotor blade elements of the mower and having a central longitudinal axis and a central transverse axis orthogonal thereto,
   roller means in each of the four quadrants defined by the intersection of said axes for maintaining said housing in fixed spacing in relation to the surface supporting said roller means and permitting movement therealong,
   a pair of rod members, each of said rod members adapted at one end to be pivotally attached to a respective side of a chassis member of said tractor, each of the other ends of said rods attached to a respective point on said housing by means of a universal joint,
   each of said rod members including resilient means located between the ends thereof to permit movement of said ends along the longitudinal axis thereof.

2. The combination of claim 1 in which said points to which said rods are attached lie in a line which is parallel to said transverse axis and which is adjacent thereto, said points being substantially equally spaced from said longitudinal axis.

3. In combination,
   a tractor having a chassis member,
   a mower having a substantially planar housing member for supporting the rotor blade elements thereof and having a central longitudinal axis and a central transverse axis orthogonal thereto,
   roller means in each of the four quadrants defined by the intersection of said axes for maintaining said housing in fixed spacing in relation to the surface supporting said roller means and permitting movement therealong,
   a pair of rod members, each of said rod members pivotally attached to a respective side of said chassis member of said tractor spaced from one end of said chassis members, each of the other ends of said rods attached to a respective point on said housing by means of a universal joint, said points lying in a line which is parallel to said transverse axis and which is adjacent thereto, said points being substantially equally spaced from said longitudinal axis,
   each of said rod members including resilient means located between the ends thereof to permit movement of said ends along the longitudinal axis thereof.

4. The combination of claim 3 in which spring means are provided for resiliently supporting said housing member from said one end of said chassis member.

5. The combination of claim 4 in which said one end of said chassis member is the front end of said chassis.

6. The combination of claim 3 in which means are attached to a third point on said housing lying between said line including said points and a side of said housing adjacent to said one end of said chassis member for elevating said housing.

7. The combination of claim 3 including a boom member having one end attached to said one end of said chassis member and having the other end thereof located outward from said one end of said chassis member, a pair of support springs, each extending from said other end of said boom member to a respective point lying on said housing.

8. The combination of claim 2 including a boom member having one end attached to said one end of said chassis member and having the other end thereof located outward from said chassis member, an elongated tape member having one end connected to a point on said housing lying between said line and a side of said housing adjacent to said one end of said chassis member and extending over said other end of said boom member, winding means connected to the other end of said tape member.

References Cited
UNITED STATES PATENTS

| | | | |
|---|---|---|---|
| 1,499,152 | 6/1924 | Chandler | 280—460 |
| 2,225,130 | 12/1940 | Otto et al. | 280—460 X |
| 2,734,326 | 2/1956 | Gebhart | 56—13.6 |
| 2,870,592 | 1/1959 | Swanson | 56—13.6 |
| 3,500,619 | 3/1970 | Bacon | 56—13.6 X |

RUSSELL R. KINSEY, Primary Examiner

U.S. Cl. X.R.

280—490